United States Patent [19]
Finch et al.

[11] 3,727,103
[45] Apr. 10, 1973

[54] THREE PHASE SYSTEM MONITORING AND CONTROL CIRCUIT

[75] Inventors: David C. Finch; Charles E. Konrad, both of Roanoke, Va.

[73] Assignee: General Electric Company, Salem, Va.

[22] Filed: June 30, 1972

[21] Appl. No.: 268,087

[52] U.S. Cl............317/13 R, 307/127, 317/33 SC, 317/40 A, 317/47, 317/48
[51] Int. Cl..................................................H02h 3/38
[58] Field of Search..................317/13 R, 47, 48, 317/40 A, 31, 33 SC; 307/127; 324/108

[56] References Cited

UNITED STATES PATENTS

| | | |
|---|---|---|
| 3,364,363 | 1/1968 | Iordanidis.........................317/47 X |
| 3,596,137 | 7/1971 | Kirsch.............................317/48 X |
| 3,700,919 | 10/1972 | Stich..............................317/48 X |

Primary Examiner—James D. Trammell
Attorney—Arnold E. Renner et al.

[57] ABSTRACT

A three-phase system monitoring and control circuit wherein the control circuit has a thyristor in series with a fuse and a relay having contacts in the three-phase system. The thyristor is controlled by a gating circuit having a unijunction transistor oscillator with an RC charging network. A system voltage monitor supplies a charging voltage to the network. If the voltage monitor detects system voltages exceeding a predetermined minimum, the oscillator is triggered. The system current monitor supplies a discharging voltage during improper phase sequence to prevent triggering. Triggering of the oscillator and the subsequent gating of the thyristor indicate there are no lost or reversed phases in the three-phase system.

15 Claims, 4 Drawing Figures

THREE PHASE SYSTEM MONITORING AND CONTROL CIRCUIT

BACKGROUND OF THE INVENTION

Although the principal purpose of a polyphase motor controller is to obtain specific performance such as starting, acceleration, deceleration and the like, it is often necessary to include, in the controller, provisions to protect both the operator and the equipment against damage from abnormal operating conditions. Motor starters normally employ an overcurrent protection device or overload, but the extent of additional protection for abnormal operating conditions varies with the application. Additional protection for a specific application may require a control responsive to reversal of phase sequence, phase loss, or undervoltage. Another application may require a control providing a combination or all of the preceding additional protection.

A device for phase-reversal protection operates to disconnect the load from a power source in the event that the phase sequence of a three-phase supply has been reversed. Reversals sometimes occur when repairmen are installing service transformers or making other repairs. Since the rotational direction of synchronous and asynchronous motors is a function of phase sequence, the inversion of phase sequence drives the motor and the load in a reverse direction. For some applications such a reversal may cause no damage, but for other applications such a reversal could be dangerous; e.g., in an elevator or a hoist. The NEMA code definition of phase-sequence reversal protection requires that a device affording such protection should prevent energization of the protected equipment of the reversal of phase sequence. The NEMA code also defines a phase sensitive relay as one which functions in accordance with the sequence of voltage or current maximums. Accordingly, it has been common practice to use one of two types of phase sensitive relays; i.e., a relay functioning in accordance with the sequence of voltage maximums or a phase sensitive relay functioning in accordance with the sequence of current maximums. Neither of these two relay types individually affords phase-sequence reversal protection as defined by the NEMA code. The voltage responsive relay will prevent energization of a controlled motor in the event of a phase reversal, but may not deenergize the motor if it is running. Conversely, the current responsive relay will not prevent energization of a controlled motor if there is a phase reversal, but will deenergize the motor upon power application.

The definition for phase failure, or phase loss, is also differentiated by the NEMA code. Often times one phase of a three phase circuit may be opened as the result of a fuse failure or the clearing of a line fault by a single phase interrupter. If an attempt is made to start a motor under these conditions, the motor will fail to start and the resultant large current will trip the overloads. Should the motor be running when one phase is opened, it will continue to run on single phase if the load torque does not exceed the single phase torque developed by the motor. While the motor is running single phase, the active phase generates a voltage in the inactive phase of a lightly loaded motor which differs very little from the normal terminal voltage so that a phase failure device which relies upon a loss of phase voltage to function may not respond to a phase failure when operating with a rotating motor load. The NEMA code differentiates between starting and running open-phase protection by defining the running protection as a device which responds to the loss of current in one phase and by defining starting protection as a device which prevents connecting the motor to the line if one phase is open. Another type of protection commonly required is for undervoltage. Undervoltage protection disconnects a motor from the line when the supply voltage drops below the minimum safe operating level of the motor.

SUMMARY OF THE INVENTION

The present invention provides a circuit having both starting and operating protection for load such as three-phase synchronous and asynchronous motors, the circuit incorporating means for detecting the phase sequence both of the voltages and of the currents of a three phase supply. Selected current and voltage inputs are phase advanced and added vectorially to provide resultant sequence signals which vary greatly between positive and negative phase sequences.

The circuit of the present invention includes a relaxation oscillator responsive to a predetermined input level. An input level which is indicative of a negative voltage or current phase sequence inhibits oscillation. The oscillator is also inhibited during alternate half-cycles of the power system, and thereby provides output pulses only if the voltage and current phase sequences are positive, and only during alternate half-cycles of the input power frequency.

The oscillator output pulses provide gating signals to a solid state switching device; e.g., a thyristor, the gating signals making the thyristor conductive during alternate half-cycles. When the thyristor is conductive, current may flow from a power source to energize the coil of a relay which controls power from the three-phase supply to the three-phase motor via contacts in the power lines between the supply and the motor. In series with the relay coil is a circuit interrupter which will interrupt, if the thyristor should short, to deenergize the relay coil and open the contacts in the lines between the supply and the motor. A circuit interrupter is used because it may be selected to interrupt when the average current level in the relay coil circuit is raised as in the event of a short in the thyristor.

It is, therefore, an object of the present invention to provide means to deenergize a motor that is running and to prevent the application of power to a motor, in the event of an improper phase sequence.

It is another object of the present invention to provide means to protect the motor, whether starting or running, from damage which may occur if there is a phase inversion.

It is a further object to provide means to protect the motor when the voltage supply level is inadequate.

It is a still further object to deenergize the motor in the event of a shorted circuit.

DESCRIPTION OF THE DRAWINGS

The foregoing and other objects of the present invention will become apparent as the following description proceeds and features of novelty which characterize the invention will be pointed out in particularity in the claims affixed to and forming a part of this specification. For a better understanding of this invention, reference is made to the accompanying drawings in which;

DETAILED DESCRIPTION

Figure 1:
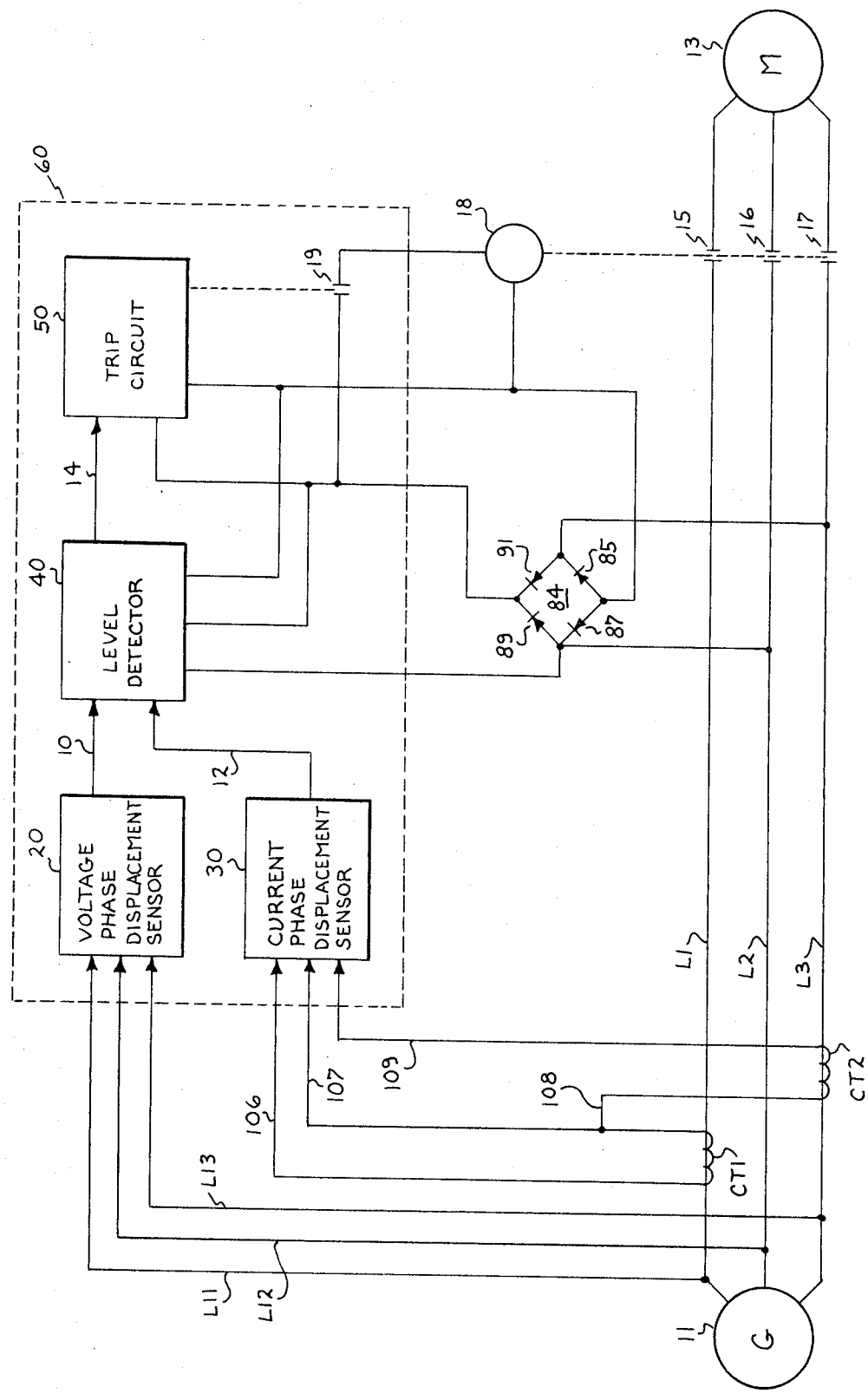
FIG. 1 is a block diagram illustrating the present invention in its preferred embodiment.

Referring now to FIG. 1, there is shown a suitable power source illustrated as a three-phase generator 11 which supplies power to a three-phase motor 13 through three power lines L1, L2, and L3. The motor 13 is connected to and disconnected from the generator 11 by contacts 15, 16 and 17 (respectively located in lines L1, L2 and L3) which are collectively operated by a contactor coil 18. Coil 18 is series connected with a contact 19 across a bridge circuit 84 comprising diodes 85, 87, 89 and 91 connected between lines L2 and L3. The closure of contact 19 energizes coil 18 to close contacts 15, 16, and 17, connecting the motor 13 to the generator 11. Conversely, opening contact 19 deenergizes coil 18 to open contacts 15, 16, and 17 thereby disconnecting the motor 13 from the generator 11. The actuating means for contact 19 are contained within a three-phase system monitoring and control circuit 60.

The system monitoring and control circuit 60 includes a voltage phase displacement sensor 20 and a current phase displacement sensor 30, each of which provides a sequence signal to a level detector circuit 40. The detector circuit 40 responds to these signals by providing gating or fault signals to a trip circuit 50 that includes actuating means for contact 19. FIG. 1, which shows the preferred embodiment of the present invention, illustrates the relationship between sensor circuits 20 and 30, level detector circuit 40, and trip circuit 50, these elements being depicted in block form. Three line-to-line system voltages are supplied from power lines L1, L2, and L3 respectively via leads L11, L12, and L13 to the voltage phase displacement sensor 20. The current phase displacement sensor 30 monitors the current flowing in lines L1 and L3 by means of current transformers CT1 and CT2 which provide currents proportional to the current flowing in lines L1 and L3. Connection to the current phase displacement sensor 30 is made from CT1 via leads 106 and 107 and from CT2 via leads 108 and 109.

Figure 2:
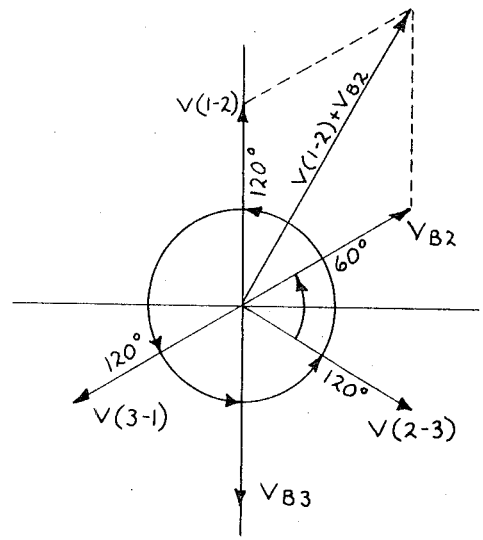
FIG. 2 is a phasor diagram showing line-to-line voltages of the three-phase system.

Operation of the voltage phase displacement sensor 20 can best be understood by reference to FIG. 2 which shows a phasor diagram wherein three line-to-line voltages V(1-2), V(2-3), and V(3-1), are shown for a 1-2- phase sequence for a counterclockwise rotational set of phasors. The voltage from line L1 to line L2 is taken at a reference where the convention V($n-m$) implies the voltage measured from line L$n$ to line L$m$. When the voltage V(2-3) is phase advanced by 60° (shown as $V_{B2}$) and vectorially added to the voltage V(1-2), the resultant voltage sequence signal is a phasor V(1-2)+$V_{B2}$. If the phase sequence is 1-2-3, the voltage V(2-3) will lag that of voltage V(1-2) by 120°. When voltage V(2-3) is phase advanced by 60° to phasor $V_{B2}$ and added vectorially to voltage V(1-2), the sum is a voltage magnitude greater than either voltage V(1-2) or voltage V(2-3).

If the phase sequence should be reversed to a 3-2-1 sequence, the voltage phasors representing voltages V(2-3) and V(3-1) will be interchanged such that if voltage V(2-3) is advanced 60° to a phasor $V_{B3}$ and added vectorially to voltage V(1-2), the sum is a voltage of very low magnitude. When the contacts 15, 16, and 17 are open, if one of the power lines L1, L2, or L3 is open between the point where the voltage phase displacement sensor is connected and the generator 11, the coupling between the motor windings will have no effect upon the voltages through leads L11, L12, and L13. There are three possible conditions under which single phase or phase loss may occur. First, line L1 may be open in which case the voltage V(1-2) is zero and the voltage V(2-3) is equal to the rated line-to-line voltage. The vector sum is then equal in magnitude to the rated line-to-line voltage. Secondly, line L2 may be open in which case the voltage V(1-2) and the voltage V(2-3) are each equal in magnitude to one-half the line-to-line voltage and of the same phase. The phasor resulting from the addition of V(1-2) and V(2-3) after a 60° phase advance is a phasor having a magnitude less than that of the minimum line-to-line voltage. Thirdly, line L3 may be opened between the sensing point and the generator 11 where the voltage V(1-2) is equal in magnitude to the line-to-line voltage and voltage V(2-3) is zero with the vector addition resulting once more in a vector sum equal in magnitude to the line-to-line voltage. Therefore, if the vector sum of the line-to-line voltage V(1-2) and the voltage V(2-3) phase advanced by 60° is equal to or less than the nominal line-to-line voltage, the system voltage phase sequence is either reversed (3-2-1) or of a zero sequence (indicating an open phase).

Figure 3:
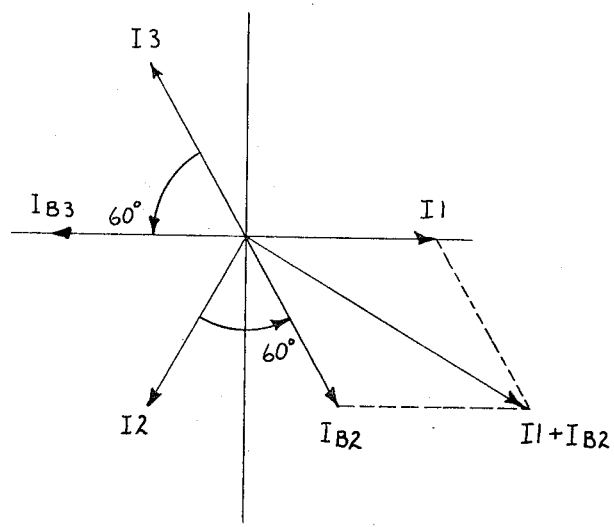
FIG. 3 is a phasor diagram illustrating current phase displacement in the three phase system; and, FIG. 4 is a detailed schematic drawing of certain elements of FIG. 1 which are illustrated therein in block form.

FIG. 3 is a phasor diagram illustrating the operation of the current phase-displacement monitor 30. Three current phasors I1, I2, and I3 are illustrated for a phase sequence 1-2-3 in a conventional counterclockwise rotation. The current flowing in line L1 (I1) is taken as a reference, and the current flowing in line L3 (I3) is phase advanced by 60° (illustrated by vector $I_{B3}$ in FIG. 3) and added vectorially to that in line L1 to provide a current sequence signal (a null summation). Should the phase sequence be reversed such that the current I2 is flowing in line L3, the resultant phase advanced phasor will be as that indicated by the phasor $I_{B2}$. The phasor sum or current sequence signal will then be other than zero indicating an improper sequence. It should also be noted that any unbalance in the magnitudes of the currents in lines L1 and L3 will result in something other than zero in the vector summation, indicating other malfunctions such as an open in one of the power lines L1, L2, or L3, or an open phase in the motor.

Referring once again to FIG. 1, normal operation of the power supply results in a voltage signal having a magnitude in excess of a predetermined level appearing on output line 10 of the voltage phase displacement sensor 20 and a zero output voltage signal from the current phase displacement sensor 30 on its output line 12. The level detector 40 responds to an inconsistency of either output 10 or 12 by providing a null output signal on line 14 to the trip circuit 50 which in turn effects an opening of contact 19 disconnecting the motor 13 from the generator 11. The trip circuit 50 is provided with a manual reset control, or may be provided with an auxiliary circuit (not shown) which will provide a preset number of attempted restarts after the voltage phase-displacement sensor 20 and the current phase displacement sensor 30 indicate that the supply voltage system is proper. A limited number of attempted restarts without a manual reset is necessary to prevent continuous cycling in the event of an open motor phase.

Figure 4:
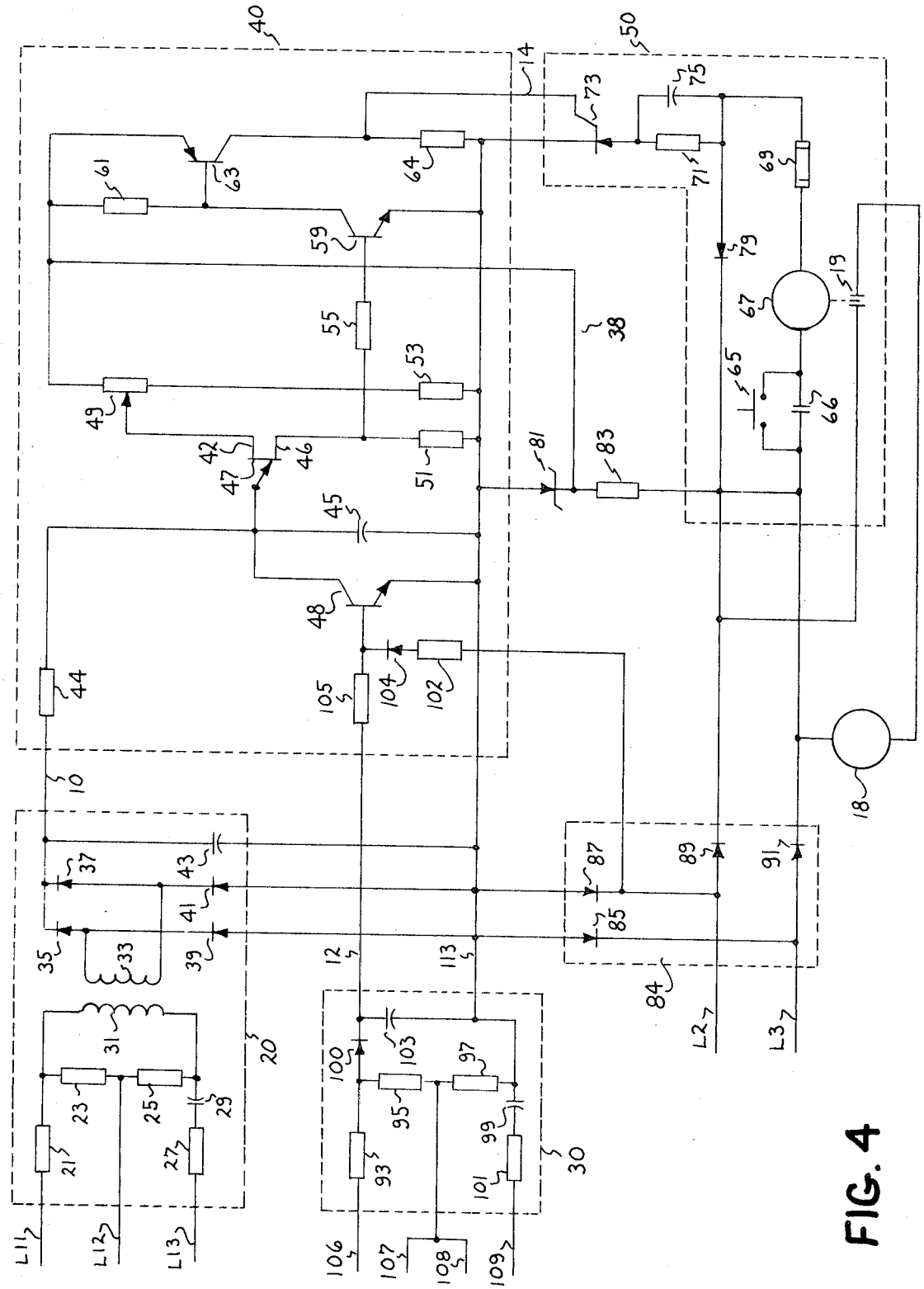

Referring now to FIG. 4, there is shown in greater detail the voltage phase displacement sensor 20, the current phase displacement sensor 30, the level detector circuit 40, and the trip circuit 50. The circuitry is arranged to fail safely for the most common mode of semiconductor failure. Within the voltage sensor 20, a voltage proportional to the line-to-line voltage V(1–2) is developed across a resistor 23 which is connected in series with a resistor 21 across the lines L1 and L2 through leads L11 and L12. Resistors 25 and 27, which are connected in series with a capacitor 29 across leads L2 and L3, are chosen to provide a voltage across resistor 25 equal in magnitude to the voltage across resistor 23, and advanced 60° from the voltage between power lines L2 and L3. The resistors 23 and 25 form a series connection with the junction between the two resistors connected to line L2 via lead L12. The voltage across the series connection of resistors 23 and 25 provides the vector summation V(1–2)+$V_{B2}$, and is supplied to a primary winding 31 of a transformer. The voltage across the transformer secondary 33 is rectified by a full-wave bridge circuit including diodes 35, 37, 39 and 41. The output voltage of the diode bridge is filtered by a capacitor 43 to form the voltage output on line 10 which forms an input to the level detector 40.

In a similar manner, within the current phase displacement sensor 30, a voltage proportional to the current flowing in power line L1 is developed across a resistor 95 by a series loop including a current transformer CT1 (shown in FIG. 1), a lead 106, a resistor 93, resistor 95, and a lead 107. A voltage proportional to the current flowing in line L3 is developed across a resistor 97, but phase advanced 60° by another series loop including a current transformer CT2 (shown in FIG. 1), a lead 108, resistor 97, a resistor 101, a capacitor 99 and a lead 109. The values of resistors 97 and 101 are chosen in conjunction with the magnitude of the capacitance of capacitor 99 to provide the proper phase advance, and the ratio of resistor 97 to resistor 101 is chosen such that the voltage magnitude across resistor 97 is equal to the voltage magnitude across resistor 95. The vector sum of the voltages across resistors 95 and 97 is half-wave rectified by a diode 100 and filtered by a capacitor 103 to form an output on line 12 from the current phase displacement sensor 30.

The level detector 40 (which also is a gating circuit) monitors the outputs on lines 10 and 12 and provides an output signal on line 14 to the trip circuit 50 when the system is functioning normally. The level detector 40 includes a positive bus 38 connected from bridge circuit 84 through a resistor 83, the voltage on bus 38 being clamped to a level determined by a zener diode 81. The positive bus 38 is bridged by the series connection of a potentiometer 49 and a resistor 53. The wiper of potentiometer 49 supplies a predetermined voltage to one base 42 of a unijunction transistor 47. A second base 46 of unijunction transistor 47 is connected to a power supply common 113 by a resistor 51. The unijunction transistor 47 has its emitter connected to power supply common 113 through a capacitor 45, and through a resistor 44 to the output line 10 of the voltage phase displacement sensor 20. The unijunction transistor 47 emitter is also connected to the power supply common 113 through the collector to base circuit of a transistor 48. The base of transistor 48 is connected through a resistor 105 to the output line 12 of the current phase displacement sensor 30. The combination of resistors 44, 51, 53, and 49, capacitor 45 and unijunction transistor 47 from a relaxation oscillator of a form well known in the art. When the voltage on output line 10 is in excess of the product of the unijunction transistor 47 intrinsic standoff-ratio and the voltage between the wiper of potentiometer 49 to the common lead 113, the oscillator will cycle providing voltage pulses across resistor 51. Should a voltage exist on output 12, transistor 48 (with its base connected to output 12) is rendered conductive, and a path is established from the emitter of unijunction transistor 47 to common 113 preventing the voltage across capacitor 45 from reaching the level necessary for oscillation, and no voltage pulses will be developed across resistor 51 from base 46 of unijunction transistor 48. On the half-cycles when line L2 is more positive than line L3, forward bias is applied to a series circuit connected from line L2 through a dropping resistor 102 and a diode 104 to the base of transistor 48; the circuit is completed from the emitter of transistor 48 through common 113 and diode 85 to line L3. When forward bias is applied, transistor 48 is rendered conductive to short circuit capacitor 45 and the emitter of unijunction transistor 47 which are connected to the collector of transistor 48. Thus the voltage across capacitor 45 is prevented from reaching the level necessary for oscillation. Hence, the development of voltage pulses across resistor 51 requires that the voltage on output line 10 must be above some level determined by potentiometer 49 setting, that the voltage at output line 12 must be zero, and that the power supply (which normally may provide voltage only on alternate half-cycles) must be available.

The voltage pulses across resistor 51 are also applied through a resistor 55 to the base of a transistor 59 (connected with its collector to bus 38 and its emitter to common 113), and appear as an amplified voltage pulse train across a resistor 61 which is connected in the collector circuit of transistor 59. The voltage pulses across resistor 61 provide base drive to a transistor 63 (connected in parallel with and in the same manner as transistor 59), and an amplified voltage pulse train appears across a resistor 64 connected in the collector circuit of transistor 63. The voltage pulses across resistor 64, which occur during alternate half cycles of the voltage between lines L2 and L3 of the current and voltage phase displacement sensors 20 and 30 indicate normal operation, form the output signal on line 14.

The trip circuit 50 maintains contact 19 closed so long as the output signal exists on line 14 from the level detector 40. During the interval in which line L3 is positive with respect to line L2, the trip circuit 50 is connected across bridge circuit 84 in a series circuit comprising: a first switching means illustrated as a contact 66 (which is shunted by a manual reset pushbutton 65) and a coil 67, a circuit interrupter illustrated as a fuse 69, the parallel connection of a resistor 71 and a capacitor 75, a second switching means illustrated as a thyristor 73, and common lead 113. During this interval, if the system monitor indicates normal operation, thyristor 73 receives gating pulses on lead 14 and is conductive. Closure of pushbutton 65 energized coil 67 which closes contact 66 (bypassing pushbutton 65) and contact 19, the latter closure energizing coil 18 to close contacts 15, 16, and 17 to apply power to the motor 13. During the next half cycle when line L3 is positive with respect to line L2, power is supplied to the trip circuit 50 through diodes 91 and 87; however, the level detector 40 does not provide gating pulses during this half-cycle; consequently, thyristor 73 turns off. The inductive energy stored in the coil 67 during the previous half-cycle maintains current flow around a series loop formed by coil 67, a current interrupting means shown as a fuse 69, a diode 79, and the closed contacts 66. The voltage stored on capacitor 75 lengthens the zero voltage period to facilitate commutation of thyristor 73.

The fail-safe features are enhanced by fuse 69. Should a failure result in the thyristor 73 conducting on successive half-cycles, the current through relay coil 67 is increased significantly. The fuse rating is chosen such that the current through relay coil 67 is inadequate to result in melting when the coil is supplied with alternate half-cycles of voltage, but low enough in current rating that the current through coil 67 will melt the element when the relay coil 67 is supplied with voltage on successive half-cycles.

In summary, this description discloses a circuit which monitors the power lines leading to a three phase motor to remove power from the motor if an undervoltage, an open phase, and/or a phase inversion condition exists. The circuit includes a unijunction transistor oscillator which normally provides pulses that are amplified to gate into conduction a solid state switching device. This oscillator is rendered conductive only if the input voltage exceeds a predetermined level, thus providing undervoltage protection. Charging of the capacitor in the oscillator is controlled by a charging network and a discharging network, these networks respectively responding to voltage input and current input each of which is phase advanced and added vectorially therein. The networks provide the motor protection against open phase and phase inversion. An additional feature is a series circuit including a circuit interrupter and a relay in which the circuit interrupter is responsive to short circuit failure.

While there has been shown and described what is at present considered to be the preferred embodiment of the invention, modifications thereto will readily occur to those skilled in the art. It is not desired, therefore, that the invention be limited to the specific arrangement shown and described and it is intended to cover in the appended claims all such modifications as fall within the true spirit and scope of the invention.

What is claimed is:

1. A circuit for detecting proper voltage and current sequence of a polyphase electrical system including a polyphase power source and a load comprising:
   a. means for providing two first signals each indicative of both magnitude and phase displacement of respective voltages of two phases of said source;
   means to phase shift one of said first signals to provide a displaced first signal;
   c. means to vectorially add the displaced first signal to the other first signal to provide a voltage sequence signal;
   d. means for providing two second signals each indicative of both magnitude and phase displacement of respective currents of two phases of said system;
   e. means to phase shift one of said second signals to provide a displaced second signal;
   f. means to vectorially add said displaced second signal to the other second signal to provide a current sequence signal; and,
   g. monitoring means responsive to said voltage sequence signal and said current sequence signal to provide a fault signal when either of said sequence signals is other than of a prescribed value.

2. The invention in accordance with claim 1 wherein said power source is a three-phase power source.

3. The invention in accordance with claim 1 further including switching means responsive to said fault signal to disconnect said load from said source.

4. The invention in accordance with claim 1 wherein the prescribed value of the voltage sequence signal is a minimum acceptable level and the current sequence signal is a maximum acceptable level.

5. The invention in accordance with claim 4 wherein the minimum acceptable level of the voltage sequence signal is a magnitude in excess of the peak voltage of the polyphase electrical system, and the maximum acceptable magnitude of the current sequence signal is approximately zero.

6. The invention in accordance with claim 3 wherein said switching means comprises a series connection of a switching device operative to conduct on alternate half cycles of one phase of said system and a current interrupting means in series with said switching device whereby improper operation of said switching device effects the operation of said current interrupting means.

7. The invention in accordance with claim 6 wherein said current interrupting means is a fuse.

8. A circuit for detecting proper voltage and current sequence of a polyphase electrical system including a polyphase power source and a load comprising:
   a. means responsive to the magnitude and phase displacement of two system voltages and two system currents to provide a fault signal indicative of improper phase sequence; and,
   b. switching means, responsive to said fault signal, operative to disconnect said source from said load, said switching means including;
      1. a series connection of a switching device operative to conduct on alternate half cycles of one phase of said system and a current interrupting means in series with said switching device whereby an improper operation of said switching device effects the operation of said current interrupting means.

9. The invention in accordance with claim 8 wherein said switching device is a thyristor.

10. The invention in accordance with claim 9 wherein said current interrupting means is a fuse.

11. A circuit for detecting proper voltage and current sequence of a polyphase electrical system including a polyphase power source and a motor comprising:
   a. means for providing two first signals each indicative of both magnitude and phase displacement of respective voltages of two phases of said source;
   b. means to phase shift one of said first signals to provide a displaced first signal;
   c. means to vectorially add the displaced first signal to the other first signal to provide a voltage sequence signal;
   d. means for providing two second signals each indicative of both magnitude and phase displacement of respective currents of two phases of said system;
   e. means to phase shift one of said second signals to provide a displaced second signal;
   f. means to vectorially add said displaced second signal to the other second signal to provide a current sequence signal;
   g. an oscillator, responsive to predetermined levels of said sequence signals, to become inoperative; and,
   h. switching means responsive to the absence of a signal from said oscillator to disconnect said source from said motor.

12. The invention in accordance with claim 11 wherein said switching means includes a series connection of a switching device operative to conduct on alternate half cycles of one phase of said system and a current interrupting means in series with said switching device whereby an improper operation of said switching device effects the operation of said current interrupting means.

13. The invention in accordance with claim 12 wherein said oscillator is a relaxation oscillator.

14. The invention in accordance with claim 12 wherein said switching means further includes contact means responsive to the absence of current through said series connection to disconnect said source from said motor.

15. The invention in accordance with claim 14 wherein said contact means is of the relay type.

* * * * *